Figure 1:
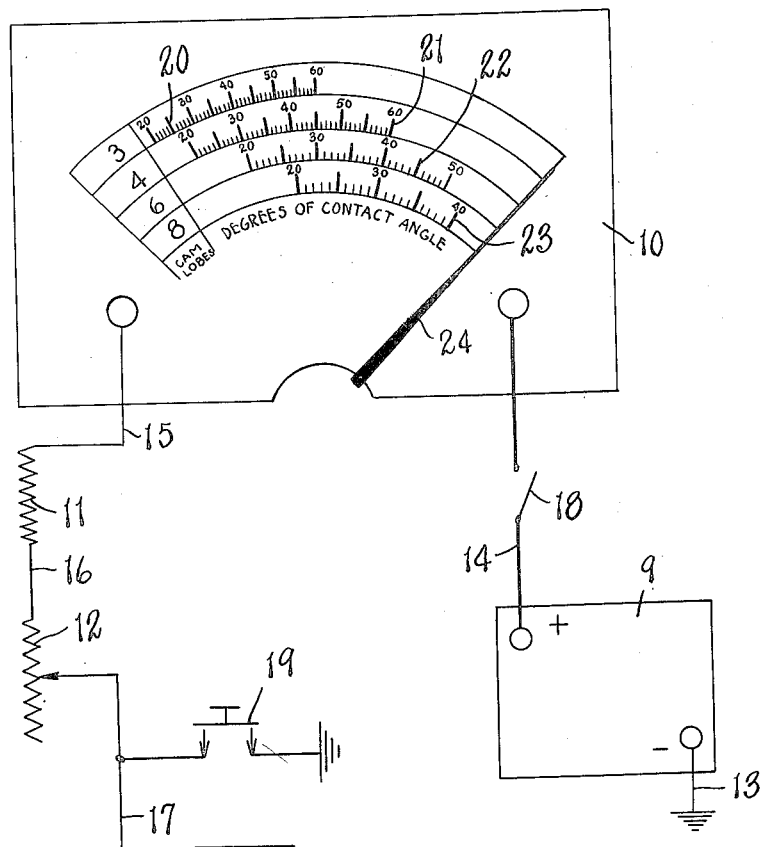
Figure 1:
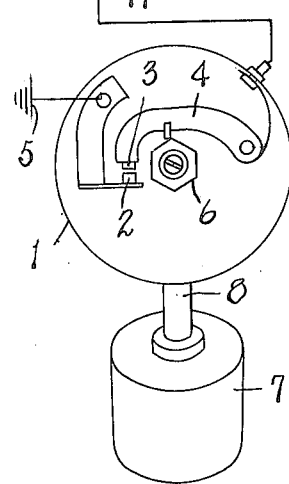

Oct. 6, 1936. G. H. ALLEN 2,056,416

METHOD AND APPARATUS FOR TESTING BREAKER MECHANISMS

Filed Nov. 8, 1934

INVENTOR.
Gerald H. Allen
BY Chappell & Earl
ATTORNEYS.

Patented Oct. 6, 1936

2,056,416

UNITED STATES PATENT OFFICE 2,056,416

METHOD AND APPARATUS FOR TESTING BREAKER MECHANISMS

Gerald H. Allen, Kalamazoo, Mich., assignor to Allen Electric & Equipment Company, Kalamazoo, Mich.

Application November 8, 1934, Serial No. 751,972

2 Claims. (Cl. 177—311)

The objects of this invention are:

First, to produce an apparatus for testing the breaker mechanism of the ignition system of an internal combustion engine to determine the length of time the breaker points are closed to energize the spark coil.

Second, to provide such a mechanism that checks the operations of the cam of the breaker mechanism that operates the points to determine the dwell thereof to determine whether the breaker mechanism is operating properly.

Third, to provide a new method for testing the breaker mechanism to determine the length of time it is closed to energize the spark coil of the engine to determine the dwell of the cam operating the breaker point.

Further objects and advantages pertaining to details and economies of construction and operation will appear from the description to follow. A preferred embodiment of my invention is illustrated in the accompanying drawing, in which:

The figure shows in a diagrammatic fashion the arrangement of the apparatus for testing the breaker mechanism.

1 is the breaker mechanism of the ignition system of an internal combustion engine. The mechanism has the stationary contact 2 and the movable contact 3 mounted on a breaker arm 4. The stationary contact is grounded as indicated at 5. The breaker mechanism shown is for a six-cylinder engine having a six-lobe cam 6 which on rotation opens and closes the points 2 and 3.

A motor 7 is used for driving the breaker mechanism in testing the same through shaft 8, the breaker mechanism being removed from the car for carrying out the test. The mechanism is mounted in any suitable means for rotating the cam 6, such means being shown in my co-pending application Serial No. 720,039, filed April 11, 1934, for Distributor testing apparatus. The details of this mechanism are not a part of this invention and are not illustrated in detail.

The apparatus consists of a batery 9, an ammeter 10, a fixed resistance 11, a variable resistance 12, and the wires 13, 14, 15, 16 and 17 arranged to connect the battery, the ammeter and the resistance in series circuit relationship with the breaker points 2 and 3 as indicated.

A switch 18 is provided for controlling the circuit and a ground switch 19 is provided for setting the apparatus before proceeding with the test. The details of the ammeter 10 are not shown because that is of standard construction. The dial is shown having four different scales thereon arranged concentrically, the scale 20 being marked out to represent 120 degrees. The scale 21 is divided to represent 90 degrees, the scale 22 to represent 60 degrees, and the scale 23 to represent 45 degrees. Adjacent the scale 20 is the numeral 3, indicating that the scale 20 is to be used for testing three-lobe cams which are used in some instances in six cylinder cars having two breaker arms operated by a single three-lobe cam. Adjacent the scale 21 is the numeral 4, indicating that that scale is to be used for testing four-lobe cams, either on four or eight cylinder cars. Adjacent the scale 22 is the numeral 6, indicating that the scale is to be used for testing six-lobe cams for either six or twelve cylinder cars, and the numeral 8 is located adjacent scale 23 to indicate that that scale is for use in testing eight-lobe cams.

The needle 24 of the ammeter is arranged to pass over all of the scales so that any scale can be used and the reading taken accurately therefrom for the various cams. In testing the breaker element, it is mounted for rotation by the motor 7. The wire 17 is connected to the breaker arm 4 and the stationary breaker point 2 is grounded. In order to simplify the setting of the apparatus, the switch 19 is closed, which completes the circuit through battery and resistances and the ammeter by-passing the breaker. This is done merely for convenience so that it is not necessary during the setting of the equipment to make sure that the breaker points 2 and 3 are closed. The switch 18 is then closed and the current from the battery 9, which is a usual storage battery, passes through the ammeter. With the current thus passing through the equipment, the variable resistance 12 is adjusted until the needle 24 rests in the position indicated in the figure, that is, at the high point of registration. The switch 19 is then open and the breaker mechanism is operated by the motor 7.

The circuit is non-inductive, so that when the breaker points 2 and 3 are closed, the current passing through the circuit reaches its full strength almost simultaneously with the closing of the breaker points and drops immediately to zero upon the opening of the points. As the breaker mechanism is operated by the motor, the cam 6 revolves, opening and closing points 2 and 3 and I have found that the needle, which is completely to the right when the current is flowing steadily through the apparatus, assumes an intermediate position, giving a reading which indicates the average amount of current passing through the circuit. This amount of current is proportioned upon the length of time the points are opened or closed. By using the apparatus it is thus possible to determine what proportion of the time the points are closed to energize the spark coil of the ignition system of an internal combustion engine. If the points are closed practically all of the time, a high reading results. If they are closed for a comparatively short time, a low reading results. By knowing the length of time that the points should be closed to obtain proper operation of the breaker, the mechanic running the test can adjust the breaker mechanism to obtain the proper reading on the ammeter.

In testing the breaker mechanism 1 shown, scale 22 would be used because the cam is six-lobe. That would indicate that if the cam were such that the breaker points were closed all of the time, full current would flow and the needle would indicate 60 degrees on scale 22. By adjusting the breaker mechanism so that the needle rests at 30 degrees on the scale 22, the mechanic would know that the cam was adjusted so that the dwell kept the points 2 and 3 closed half the time, or while the cam 6 was rotating through a 30 degree arc. Any other adjustment would be fully indicated on the ammeter.

I have found that if the 360 degrees of rotation of the breaker or cam is apportioned equally to the lobes of the cam, the scale on the ammeter covering the number of degrees thus apportioned will permit the ammeter to give a reading of the number of degrees of travel of the cam during which the breaker points are closed. The position of the needle is dependent on the length of time that the breaker points are closed relative to the total length of time consumed in rotating the breaker cam, and the length of time is proportionate to the number of degrees of movement of the cam in holding the breaker points together.

I have thus in my apparatus made possible the use of a gauge having a dial on which the operator of the apparatus can read the number of degrees of dwell of the cam of the breaker. I have described my invention in the modification preferred by me and wish to claim the same specifically as well as broadly, as pointed out in the appended claims.

Having thus described my invention, what I claim as new and desire to secure by Letters Patent is:

1. In an apparatus for testing the breaker mechanism of the ignition system of an internal combustion engine to determine the length of time the points of the breaker mechanism are closed to energize the spark coil, the combination of an ammeter having a needle and a plurality of concentric scales representing 120, 90, 60 and 45 degrees over which said needle operates simultaneously, a source of direct current, a variable resistance in series circuit relationship to form a non-inductive circuit, means for connecting the breaker mechanism to be tested in series circuit relationship with said circuit, and means in addition to said breaker for short circuiting said breaker and closing the circuit through the resistance, the ammeter and the source of current, and means for driving said breaker mechanism.

2. In an apparatus for testing the breaker mechanism of the ignition system of an internal combustion engine to determine the length of time the points of the breaker mechanism are closed to energize the spark coil, the combination of an ammeter having a needle and a plurality of concentric scales representing 120, 90, 60 and 45 degrees over which said needle operates simultaneously, a source of direct current, a variable resistance in series circuit relationship to form a non-inductive circuit, means for connecting the breaker mechanism to be tested in series circuit relationship therewith, and means for driving said breaker mechanism.

GERALD H. ALLEN.